United States Patent Office 2,721,886
Patented Oct. 25, 1955

2,721,886

CATALYZED CONDENSATION OF AROMATIC COMPOUNDS WITH UNSATURATED ORGANIC COMPOUNDS

Herman Pines, Evanston, Ill., and Vladimir N. Ipatieff, deceased, late of Chicago, Ill., by Vladimir Haensel, Hinsdale, Herman Pines, Evanston, and Vincetta Kibort, Chicago, Ill., executors, assignors to Universal Oil Products Company, Des Plaines, Ill., a corporation of Delaware No Drawing. Application June 7, 1954, Serial No. 435,032

20 Claims. (Cl. 260—668)

This application is a continuation-in-part of our copending application Serial No. 219,312, filed April 4, 1951, now abandoned.

This invention relates to the condensation of unsaturated organic compounds with aromatic compounds and to products formed thereby. This invention relates more particularly to the side chain alkylation with an olefin of an alkylaromatic hydrocarbon in which a carbon atom combined with the aromatic nucleus is also combined with at least one hydrogen atom. The process relates more particularly to the side chain ethylation of an alkylbenzene hydrocarbon having at least one hydrogen atom combined with a carbon atom in the alpha position to the benzene ring.

The condensation of aromatic compounds with unsaturated organic compounds such as the alkylation of aromatic hydrocarbons with olefinic hydrocarbons has been the subject of many investigations over a long period of time. Many different catalysts have been used including various mineral acids and acid-acting compounds but in all of these reactions nuclear condensation has always been effected. Thus in the acid-catalyzed alkylation of aromatic compounds having attached to a carbon atom of the ring a saturated carbon atom to which is attached at least one hydrogen atom, the entering alkyl group attaches to the aromatic nucleus. No direct catalytic method of introducing the alkyl group into the side chain has been known, particularly no direct catalytic method which can be utilized at reasonably low operating pressures and moderate temperatures. Such can now be accomplished by utilization of the process of this invention.

We have found that side chain alkylation of toluene and other carbocyclic aromatic and heterocyclic aromatic ring compounds having a nonolefinic double bond such as pyridine, quinoline, pyrrole, etc., and having attached to a nuclear carbon atom a saturated carbon atom to which is attached at least one hydrogen atom may also be used as starting materials to effect side chain alkylation with an olefin at moderate temperatures and pressures in the presence of a catalyst comprising essentially a free alkali metal and a minor promoting amount of a polycyclic hydrocarbon. The carbon atom which is attached to the aromatic nucleus of said aromatic compounds is referred to as a saturated carbon atom because it is part of a non-olefinic group such as an alkyl group, a cycloalkyl group, a cycloalkalkyl group, or an aralkyl group containing no ethylenic double bonds or similar unsaturation. The carbon atom which is attached to an aromatic nucleus is thus a part of a saturated group including an alkyl group, a cycloalkyl group, a cycloalkalkyl group and an aralkyl group (such as a $C_6H_5$—$CH_2$— group) containing no olefinic unsaturation.

An object of this invention is to react an unsaturated organic compound with an aromatic compound selected from the group consisting of carbocyclic and heterocyclic aromatic ring compounds having attached to a nuclear carbon atom a nonolefinic or saturated carbon atom to which is attached at least one hydrogen atom.

An additional object is to react a monoolefin with an alkylaromatic hydrocarbon to form an aromatic hydrocarbon with a longer alkyl group.

Another object of this invention is to condense ethylene with the side chain of an aromatic compound having attached to a nuclear carbon atom a saturated carbon atom to which is attached at least one hydrogen atom.

Another object of this invention is to condense ethylene with the side chain of an alkylaromatic hydrocarbon having attached to a nuclear carbon atom a carbon atom of said alkyl group to which is attached at least one hydrogen atom.

Still another object of this invention is to condense ethylene with the alkyl side chain of an alkylbenzene hydrocarbon, said side chain containing an alpha carbon atom to which is attached a replaceable hydrogen atom.

A further object of this invention is to condense ethylene with the cycloalkyl group of a cycloalkylbenzene hydrocarbon, said cycloalkyl group having a hydrogen atom combined with the carbon atom of the cycloalkyl group which is attached to the aromatic ring.

A still further object of this invention is to provide a process for the side chain alkylation of an alkylaromatic hydrocarbon.

A further object of this invention is to condense ethylene with a polycyclic aromatic hydrocarbon having at least one of the rings saturated and having at least one hydrogen atom combined with the carbon atom of the saturated ring which is attached to the aromatic ring.

An additional object of this invention is to provide a method for producing an aromatic compound containing a longer hydrocarbon side chain, said compound being useful in the production of detergents, wetting agents, and the like.

One embodiment of this invention relates to a process which comprises reacting a nonconjugated olefinic hydrocarbon and an aromatic compound selected from the group consisting of carbocyclic aromatic and heterocyclic aromatic ring compounds having attached to a nuclear carbon atom a carbon atom of a hydrocarbon group selected from the group consisting of an alkyl group, a cycloalkyl group, a cycloalkalkyl group, and an aralkyl group and to which last-named carbon atom is attached at least one hydrogen atom, the process being carried out at a temperature of from about 100° to about 350° C. and at a pressure of from about 5 to about 50 atmospheres in the presence of a free alkali metal and of a minor promoting amount of a polycyclic hydrocarbon capable of reacting with a portion of said free alkali metal to form a metalized polycyclic hydrocarbon, and recovering the resultant condensation product.

A second embodiment of this invention relates to a process which comprises reacting a nonconjugated olefinic hydrocarbon and an aromatic compound selected from the group consisting of carbocyclic aromatic and heterocyclic aromatic ring compounds having attached to a nuclear carbon atom a carbon atom of a saturated hydrocarbon group and to which last-named carbon atom is attached at least one hydrogen atom at a temperature of from about 100° to about 350° C. and at a pressure of from about 5 to about 50 atmospheres in the presence of a free alkali metal and of a minor promoting amount of a polycyclic hydrocarbon capable of reacting with a portion of said free alkali metal to form a metalized polycyclic hydrocarbon.

Another embodiment of this invention relates to a process which comprises reacting a nonconjugated olefinic hydrocarbon and an aromatic compound selected from the group consisting of carbocyclic aromatic and heterocyclic aromatic ring compounds having attached to a nuclear carbon atom a carbon atom of a saturated hydrocarbon group and to which last-named carbon atom is attached at least one hydrogen atom at a temperature of from about 100° to about 350° C. and at a pressure of from about 5 to about 50 atmospheres in the presence of a free alkali metal and of a minor promoting amount of a polynuclear aromatic hydrocarbon capable of reacting with a portion of said free alkali metal to form a metalized polynuclear hydrocarbon.

Still another embodiment of this invention relates to a process which comprises reacting a nonconjugated olefinic hydrocarbon and an aromatic compound selected from the group consisting of carbocyclic aromatic and heterocyclic aromatic ring compounds having attached to a nuclear carbon atom a carbon atom of a saturated hydrocarbon group and to which last-named carbon atom is attached at least one hydrogen atom at a temperature of from about 100° to about 350° C. and at a pressure of from about 5 to about 50 atmospheres in the presence of a free alkali metal and of a minor promoting amount of a fused ring polycyclic aromatic hydrocarbon capable of reacting with a portion of said free alkali metal to form a metalized polynuclear hydrocarbon.

A further embodiment of this invention relates to a process which comprises reacting a monoolefin with an aromatic compound selected from the group consisting of carbocyclic aromatic and heterocyclic aromatic ring compounds having attached to a nuclear carbon atom a carbon atom of a hydrocarbon group selected from the group consisting of an alkyl group, a cycloalkyl group, a cycloalkalkyl group, and an aralkyl group and to which last-named carbon atom is attached at least one hydrogen atom, the process being carried out at a temperature of from about 100° to about 350° C. and at a pressure of from about 5 to about 50 atmospheres in the presence of a free alkali metal and of a minor promoting amount of a polycyclic hydrocarbon capable of reacting with a portion of said free alkali metal to form a metalized polycyclic hydrocarbon, and recovering the resultant condensation product.

A further embodiment of this invention relates to a process which comprises reacting an alkene with an aromatic compound selected from the group consisting of carbocyclic aromatic and heterocyclic aromatic ring compounds having attached to a nuclear carbon atom a carbon atom of a hydrocarbon group selected from the group consisting of an alkyl group, a cycloalkyl group, a cycloalkalkyl group, and an aralkyl group and to which last-named carbon atom is attached at least one hydrogen atom, the process being carried out at a temperature of from about 100° to about 350° C. and at a pressure of from about 5 to about 50 atmospheres in the presence of a free alkali metal and of a minor promoting amount of a polycyclic hydrocarbon capable of reacting with a portion of said free alkali metal to form a metalized polycyclic hydrocarbon, and recovering the resultant condensation product.

A further embodiment of this invention relates to a process which comprises reacting ethylene with an aromatic compound selected from the group consisting of carbocyclic aromatic and heterocyclic aromatic ring compounds having attached to a nuclear carbon atom a carbon atom of a hydrocarbon group selected from the group consisting of an alkyl group, a cycloalkyl group, a cycloalkalkyl group, and an aralkyl group and to which last-named carbon atom is attached at least one hydrogen atom, the process being carried out at a temperature of from about 100° to about 350° C. and at a pressure of from about 5 to about 50 atmospheres in the presence of a free alkali metal and of a minor promoting amount of a polycyclic hydrocarbon capable of reacting with a portion of said free alkali metal to form a metalized polycyclic hydrocarbon, and recovering the resultant condensation product.

A still further embodiment of this invention relates to a process which comprises reacting ethylene and an aromatic hydrocarbon having attached to a nuclear carbon atom a carbon atom of a saturated hydrocarbon group and to which last-named carbon atom is attached at least one hydrogen atom at a temperature of from about 100° to about 350° C. and at a pressure of from about 5 to about 50 atmospheres in the presence of a free alkali metal and of a minor promoting amount of a polycyclic hydrocarbon capable of reacting with a portion of said free alkali metal to form a metalized polycyclic hydrocarbon.

A still further embodiment of this invention relates to a process which comprises reacting ethylene and a benzene hydrocarbon having attached to a nuclear carbon atom a carbon atom of a saturated hydrocarbon group and to which last-named carbon atom is attached at least one hydrogen atom at a temperature of from about 100° to about 350° C. and at a pressure of from about 5 to about 50 atmospheres in the presence of a free alkali metal and of a minor promoting amount of a polycyclic hydrocarbon capable of reacting with a portion of said free alkali metal to form a metalized polycyclic hydrocarbon.

An additional embodiment of this invention relates to a process for producing normal propylbenzene which comprises reacting ethylene and toluene at a temperature of from about 100° to about 350° C. and at a pressure of from about 5 to about 50 atmospheres in the presence of a catalyst comprising essentially a free alkali metal and a minor promoting amount of a polycyclic hydrocarbon capable of reacting with a portion of said free alkali metal, and recovering normal propylbenzene from the resultant reaction product.

Still another embodiment of this invention relates to a process for producing normal propylbenzene which comprises reacting ethylene and toluene at a temperature of from about 100° to about 350° C. and at a pressure of from about 5 to about 50 atmospheres in the presence of a catalyst comprising essentially free sodium and a minor promoting amount of anthracene capable of reacting with a portion of said free sodium to form a sodium anthracene, and recovering normal propylbenzene from the resultant reaction product.

The compounds with which unsaturated organic compounds are condensed in our process comprise aromatic compounds having attached to a nuclear carbon atom a carbon atom of a saturated hydrocarbon group and to which last-named carbon atom is attached at least one hydrogen atom. By the term aromatic compound we mean to include not only alkylated benzenes, substituted benzenes, naphthalenes, and derivatives thereof, but also all compounds containing the stable ring or nucleus such as is present in benzene and which possesses unsaturation in the sense that benzene does, but which have no ethylenic unsaturation. Consequently, it can be seen that the term aromatic compound, in the sense in which it is used in the specification and the appended claims, includes not only carbocyclic compounds, but also heterocyclic compounds having stable nuclei. The carbocyclic compounds may have a benzene, naphthalene, etc. nucleus. The heterocyclic compounds may have a pyridine, furan, thiophene, pyrrole, pyrazole, etc., nucleus. In addition, the aromatic compounds contemplated for use in our process may contain both a carbocyclic ring and a heterocyclic ring such as is found in indole and in carbazole. Also, the aromatic compounds may contain both a benzene nucleus and a cycloalkane nucleus such as is found in tetralin and in indan.

As hereinbefore stated, the aromatic compounds preferred for use in our process contain a saturated side chain, said chain being attached to a nuclear carbon atom by a saturated carbon atom, that is a carbon atom that is bonded by univalent bonds to four other atoms. The saturated carbon atom should have at least one hydrogen atom attached thereto. These requisites are desirable for the reason that aromatic compounds, such as tert-butylbenzene, which do not have a hydrogen atom attached to the alpha carbon atom, show very little or no tendency under the conditions of operation employed in our process to undergo condensation of the type herein taught. Similarly, styrene, in which the alpha carbon atom in the side chain is unsaturated, does not condense with unsaturated organic compounds in the manner herein specified. Thus the preferred aromatic compounds are those in which the alpha carbon atom of the side chain is saturated and in which said alpha carbon atom has at least one hydrogen atom attached thereto. The side chain may comprise only one carbon atom as the methyl group in toluene, or it may comprise a number of saturated carbon atoms in straight-chain or branched-chain relation such as the normal butyl radical or the isobutyl radical in normal butylbenzene and in isobutylbenzene, respectively. The substituent need not necessarily be an aliphatic chain; it may be a cycloalkane radical as in tetralin or as in cyclohexylbenzene or an aralkyl group as a benzyl group as in diphenylmethane.

Suitable alkylaromatic hydrocarbons include toluene, ethylbenzene, n-propylbenzene, isopropylbenzene (cumene), n-butylbenzene, isobutylbenzene, sec-butylbenzene, m-xylene, o-xylene, p-xylene, mesitylene, methyl naphthalene, and the like. Other suitable aromatic hydrocarbons include cyclohexylbenzene, indan, diphenylmethane, cyclopentylbenzene, cyclohexylbenzene, methylcyclohexylbenzene, methylethylbenzene, etc.

The aromatic ring in the compounds herein referred to may contain other substituents such as a chloro group, a methoxy group, an ethoxy group, a nitro group, and the like.

The aromatic reactants employed in our process are condensed with nonconjugated unsaturated organic compounds. The unsaturated organic compounds are olefinic in character and include monoolefins and particularly ethylene. For the purposes of this invention, aromatic compounds such as benzene are not regarded as being unsaturated. Examples of unsaturated organic compounds suitable for use in this process include monoolefins such as ethylene, propylene, 1-butene, 2-butene, and isobutylene, along with other monoolefins of higher molecular weight; nonconjugated dienes such as 2,5-dimethyl-1,5-hexadiene and nonconjugated polyolefins containing more than two pairs of double bonds per molecule. As stated above, ethylene is particularly preferred as are other monoolefins in which the alpha carbon atom adjacent the double bond is completely saturated, that is contains no hydrogen atoms such as in 3,3-dimethyl-1-butene. Other similar unsaturated compounds are well-known to those skilled in the art.

Catalysts which are useful in this process include free alkali metals and a minor promoting amount of a polycyclic hydrocarbon and preferably those which react with a portion of said free alkali metals to form metalized polycyclic hydrocarbons. In other words, the catalysts which are useful in this process include free alkali metals in combination with metalized polycyclic hydrocarbons formed in situ by the reaction of a portion of the alkali metal with the polycyclic hydrocarbon promoter which is added thereto. Preferred polycyclic hydrocarbons are polynuclear aromatic hydrocarbons having fused aromatic rings and generally contain more than one aromatic ring per molecule. Of the alkali metal group including lithium, sodium, potassium, rubinium, and cesium, the more plentiful sodium and potassium are generally preferred and particularly sodium is preferred because of its relatively low cost. These alkali metals are used in conjunction with a minor but promoting amount of a polycyclic hydrocarbon including polynuclear aromatic hydrocarbons such as anthracene, dihydroanthracene, phenanthrene, fluorene, and the like. Other suitable polycyclic hydrocarbons include tetralin, diphenylmethane, o-diphenylbenzene, etc. The presence of both free alkali metal and a minor promoting amount of one or more of the mentioned class of polycyclic aromatic hydrocarbons is necessary for effecting the condensation of an olefin such as ethylene with the alkyl side chain or other saturated side chain of a carbocyclic or heterocyclic ring compound having attached to a nuclear carbon atom a saturated carbon atom to which is attached at least one hydrogen atom at a temperature of from about 100° to about 350° C. and at a pressure of from about 5 to about 50 atmospheres.

Better contacting of the reactants and catalysts and improved yields of desired products is sometimes effected by mixing the free alkali metal and polycyclic hydrocarbon catalyst mixture with a catalyst supporting or spacing material such as activated charcoal. Also, granular coke, silica, alumina, pumice, porcelain, quartz, etc.; steel turnings, copper shot, etc., which do not have an adverse influence on the reaction but improve the mixing may be used. Such spacing materials are useful in either batch type operation as in an autoclave or in continuous treatment in a tubular reactor or other suitable apparatus.

The process of this invention is carried out using either batch or continuous types of operation in suitable equipment such as an autoclave or tubular reactors constructed from steel or glass lined steel reactors. The process is carried out at a temperature of from about 100° to about 350° C. and preferably at a temperature of from about 150° to about 275° C. at a pressure of from about 5 to about 50 atmospheres. When the stirring or mixing of the reactants and catalyst is very thorough and efficient the process may be carried out readily at a temperature of 125° C. and at a pressure of 5 atmospheres but higher temperatures and pressures are preferred when the mixing is less efficient. Pressures of greater than 50 atmospheres are not necessary and temperatures greater than about 350° C. will seldom be needed. The operating temperature and pressure will also depend upon the aromatic and olefinic hydrocarbons charged and upon the ratios of reactants present in the reaction zone as well as upon the catalyst present therein.

In order to promote the primary side chain alkylation, that is to attach only one alkyl group to the alkyl side chain and in some instances to diminish the loss of olefin through undesired side reactions, it is generally preferred to employ an excess of aromatic hydrocarbon to olefin such as ethylene in the process. In other words, the preferred ratio of aromatic hydrocarbon to olefinic hydrocarbon is greater than one.

The amount of free alkali metal catalyst used in the process is dependent upon the catalyst and reactivity of the aromatic hydrocarbon undergoing side chain alkylation and upon the nature of the olefin used as the side chain alkylating agent. It has been found that rather large amounts of free alkali metal are desirable, particularly when the reaction is carried out under conditions which do not assure thorough mixing. It is preferred to use greater than about 2% by weight of free alkali metal based on the aromatic hydrocarbon reactant. The amount of polycyclic hydrocarbon promoter necessary has been determined as the mol ratio of free alkali metal to polycyclic hydrocarbon promoter. A mol ratio of free alkali metal to promoter greater than two is always desirable; mol ratios of free alkali metal to promoter of greater than five are preferred and better results have been obtained when this mol ratio is 10:1 or higher. This of course means that when the percentage by weight of free alkali metal based upon the aromatic reactant is fixed, smaller amounts of polycyclic hydrocarbon promoter are more desirable than larger amounts. The larger amounts result in lower mol ratios as hereinabove set forth.

In carrying out the process the olefinic hydrocarbon such as ethylene may be introduced continuously or intermittently, the latter method being commonly employed in the usual type of batch operation conducted in an autoclave so that the consumption of ethylene can be followed by observing the decrease in operating pressure of the autoclave as the reaction progresses. After the reaction has reached the desired stage of completion, the reaction products are discharged from the autoclave, unsaturated olefins such as ethylene are recovered for further use in the process or utilized for some other purpose. The mixture of reaction products is then subjected to suitable separation treatment such as filtration to remove unconsumed alkali metal catalyst and promoter followed by fractional distillation of normally liquid products to separate unconverted charging stock from side chain alkylated products and higher boiling materials, the latter being sometimes formed as by-products of the reaction.

In this process one molecular proportion of olefin such as ethylene and one molecular proportion of alkylaromatic hydrocarbons such as toluene react in the presence of a catalyst such as sodium and a minor promoting amount of anthracene to form a longer chain alkylaromatic hydrocarbon as illustrated by the following equation:

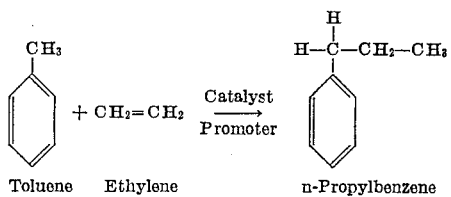

Toluene   Ethylene   n-Propylbenzene

The resultant reaction product such as n-propylbenzene may sometimes react with a further molecular proportion of olefin such as ethylene to form a still longer chain alkylaromatic hydrocarbon as indicated in the following equation:

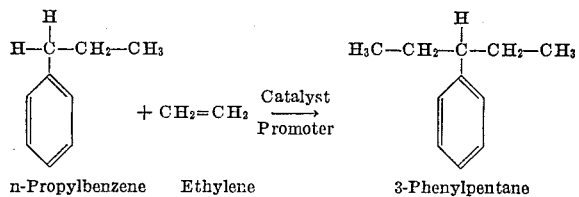

n-Propylbenzene   Ethylene   3-Phenylpentane

Other alkylaromatic hydrocarbons and cycloalkylaromatic hydrocarbons may be reacted similarly with ethylene to produce longer chain alkylaromatic hydrocarbons from one molecular proportion of the chraged alkylaromatic hydrocarbon and one, two, or more molecular proportions of the olefin.

The side chain alkylated compounds and particularly long chain alkylaromatic hydrocarbons formed in this process are useful as starting materials for the production of wetting agents, synthetic detergents, and the like. For example, a long chain alkylbenzene hydrocarbon such as a tridecylbenzene which is produced by condensing n-butylbenzene or sec-butylbenzene with a nonene fraction formed by polymerizing propylene in the presence of a solid phosphoric acid catalyst is a suitable starting material for detergent production. The tridecylbenzene is sulfonated with strong sulfuric acid to form tridecylbenzene sulfonic acid which is then neutralized with caustic soda, sodium bicarbonate or other alkaline material to form a salt of tridecylbenzene sulfonic acid, said salt being useful as a detergent for the washing of soiled cotton cloth or other materials. Some of the other condensation products formed by this process are also useful as intermediates in the production of chlorinated alkylaryl hydrocarbons useful as insecticides and the condensation products may also be used as intermediates in the production of dyes, medicinals, etc.

The nature of this invention is illustrated further by the following examples which, however, should not be misconstrued to limit unduly the generally broad scope of the invention.

EXAMPLE I

A glass lined rotatable steel autoclave of 850 cc. capacity was charged with 92 grams of toluene and 10 grams of sodium. The autoclave was then closed and ethylene was introduced into the autoclave to an initial pressure of 30 atmospheres. The autoclave containing the toluene, sodium, and ethylene was then rotated and heated for three hours at a temperature of 200–325° C. after which the autoclave was permitted to cool to room temperature. The residual ethylene was then discharged from the autoclave. The mixture of liquid products and used sodium was filtered to remove the sodium therefrom and the filtrate was subjected to fractional distillation. The distillation separated the liquid products into fractions and the fractions with their properties shown in Table I:

*Table 1*

FRACTIONAL DISTILLATION OF REACTION PRODUCTS FROM ETHYLATION OF TOLUENE WITH SODIUM ALONE

| Fraction No. | Boiling Point, ° C. | Grams | Composition |
| --- | --- | --- | --- |
| 1 | 109–113 | 89.3 | Toluene. |
| 2 | 113–156 | 1.2 | 0.3 Grams Toluene. |
| 3 | 156+ | 0.7 | Bottoms. |

As can be seen from the table side chain ethylation if it occurred at all, yielded 1.6 grams of product. Neither n-propylbenzene nor 3-phenylpentane were observed in the product.

EXAMPLE II

Essentially the same procedure as described in Example I was used in the following runs in order to evaluate variables. The first series of work was carried out with varying amounts of sodium (in chunk form) with the amount of anthracene promoter held constant.

Table II
ETHYLATION OF TOLUENE WITH SODIUM AND ANTHRACENE

| Run No | 1 | 2 | 3 |
|---|---|---|---|
| Toluene: | | | |
| Grams | 92 | 92 | 92 |
| Mols | 1.0 | 1.0 | 1.0 |
| Ethylene, Atmospheres | 30 | 30 | 30 |
| Sodium: | | | |
| Grams | 10 | 5 | 2 |
| Mols | 0.44 | 0.22 | 0.09 |
| Anthracene: | | | |
| Grams | 4.0 | 4.0 | 4.0 |
| Mols | 0.02 | 0.02 | 0.02 |
| Temperature, °C | 200 | 200 | 200 |
| Duration, Hours | 5 | 4 | 4 |
| Toluene Reacted, Mol Percent | 65 | 41 | 0 |
| Yield, Mol Percent: | | | |
| n-Propylbenzene | 57 | 70.8 | 0 |
| 3-Phenylpentane | 21.6 | 14.5 | 0 |
| Mol Ratio, Sodium/Promoter | 22 | 11 | 4.5 |
| Wt. Percent Promoter, Based on Sodium | 40 | 80 | 200 |

The yields given in the above table are based upon the mol per cent of toluene reacted. Run 1 illustrates that anthracene is a promoter for the side chain ethylation of toluene under conditions where sodium alone is not a catalyst for the reaction. The combined results of runs 1, 2, and 3 tend to indicate that a minimum percentage of sodium based on the alkylaromatic hydrocarbon to be alkylated is necessary and that even with sufficient anthracene present, alkylation does not take place below this apparent critical percentage of sodium. It will be noted that the amount of anthracene was kept constant in the preceding runs.

The following two runs were carried out in a manner similar to that described in Example I and illustrate that the form of sodium used may be important. The results obtained are presented in the following Table III:

Table III
SIDE CHAIN ETHYLATION OF TOLUENE WITH SODIUM AND ANTHRACENE

| Run No | 4 | 5 |
|---|---|---|
| Toluene: | | |
| Grams | 92 | 92 |
| Mols | 1.0 | 1.0 |
| Ethylene, Atmospheres | 30 | 30 |
| Sodium: | | |
| Grams | a 5 | b 5 |
| Mols | 0.22 | 0.22 |
| Anthracene: | | |
| Grams | 2.0 | 2.0 |
| Mols | 0.01 | 0.01 |
| Temperature, °C | 200 | 200 |
| Duration, Hours | 4 | 4 |
| Toluene Reacted, Mol Percent | 0 | 48 |
| Yield, Mol Percent: | | |
| n-Propylbenzene | 0 | 70.9 |
| 3-Phenylpentane | 0 | 16.6 |
| Mol Ratio, Sodium/Promoter | 22 | 22 |
| Wt. Percent Promoter, Based on Sodium | 40 | 40 | a Chunk form.
b Ribbon form.

From the above results in Table III it is apparent that the form of sodium utilized is important. These results are explained on the basis that coating of the sodium chunks with reactants or reaction products occurs rendering them catalytically inactive when a minimum amount of sodium is present. Thus, the ribbon form of sodium which is a more highly dispersed form is more satisfactory. Similarly satisfactory dispersion of the sodium can also be obtained by the introduction of glass helices into the autoclave liner along with the reactants.

A comparison of run 2, Table II, and run 4, Table III, might lead one to the erroneous conclusion that a rather high minimum amount of promoter is required to initiate the reaction. In each of the above-mentioned runs, that is runs 2 and 4, the sodium utilized was in chunk form. The following table illustrates that a smaller amount of promoter can be successfully utilized when a satisfactory sodium dispersion is present. The results obtained are presented in the following Table IV:

Table IV
SIDE CHAIN ETHYLATION OF TOLUENE WITH SODIUM AND ANTHRACENE

| Run No | 6 | 7 | 8 |
|---|---|---|---|
| Toluene: | | | |
| Grams | 92 | 92 | 92 |
| Mols | 1.0 | 1.0 | 1.0 |
| Ethylene, Atmospheres | 30 | 30 | 30 |
| Sodium: | | | |
| Grams | a 5 | b 5 | b 5 |
| Mols | 0.22 | 0.22 | 0.22 |
| Anthracene: | | | |
| Grams | 4.0 | 2.0 | 0.8 |
| Mols | 0.02 | 0.01 | 0.004 |
| Temperature, °C | 200 | 200 | 200 |
| Duration, Hours | 4 | 4 | 4 |
| Toluene Reacted, Mol Percent | 41 | 48 | 35 |
| Yield, Mol Percent: | | | |
| n-Propylbenzene | 70.8 | 70.9 | 71.1 |
| 3-Phenylpentane | 14.5 | 16.6 | 11.4 |
| Mol Ratio, Sodium/Promoter | 11 | 22 | 54 |
| Wt. Percent Promoter, Based on Sodium | 80 | 40 | 16 | a Chunk form.
b Ribbon form.

The above results are all approximately the same as can be readily observed. These results show that not only is the form of sodium important but that the amount of promoter can be readily reduced to a very minor amount, in run 8 to a sodium to anthracene mol ratio of 54:1. Where it might have previously seemed necessary to have a minimum amount of anthracene with the sodium in chunk form, it is now successfully demonstrated that such is not the case.

With reference to runs 1–8 above, it will be noted that the reaction of toluene with ethylene proceeds at a temperature of about 200° C. and at an initial pressure of 30 atmospheres. The reaction is catalytic since only a relatively small amount of sodium is necessary to cause the reaction. The product of the reaction consists predominantly of n-propylbenzene and 3-phenylpentane. The presence of isopropylbenzene and n-amylbenzene was not detected. Side chain alkylation does not occur on contacting 92 grams of toluene with ethylene in the presence of sodium but in the absence of anthracene at 200–325° C. under pressure. A similar reaction carried out in the presence of sodium and of four grams of anthracene caused side chain ethylation of toluene. The mol per cent yields of products in each of the above tables is based upon the mol per cent toluene reacted.

EXAMPLE III

Essentially the same procedure as was followed in Example I was used in a number of runs to determine the effect of the alkyl group upon the side chain ethylation of different alkylaromatic hydrocarbons and related hydrocarbons. These runs were made on toluene, ethylbenzene, isopropylbenzene, tert-butylbenzene, cyclohexylbenzene, o-xylene, m-xylene, p-xylene, mesitylene, indan, and methylnaphthalene. In each case, a pyrex glass autoclave liner was charged with the alkylaromatic hydrocarbon, sodium (in the form of ribbon) and anthracene and the charged glass liner was then placed in a stainless steel autoclave at 850 cc. capacity. The autoclave was then flushed with nitrogen to remove air prior to addition of the ethylene to an initial pressure of 30 atmospheres. The autoclave was then heated to 200–225° C. and maintained at that temperature for four hours during which a break was generally observed in the total operating pressure. The autoclave was then cooled to room temperature overnight, the gases were collected and analyzed and the product in the glass liner was weighed and filtered. The sodium and any sludge that might have formed were washed with normal pentane and the pentane wash was added to the filtered product. The mixture of filtered product and pentane was distilled and the various products obtained from the reaction were analyzed generally by means of infrared spectroscopy. In some instances, synthesis of hydrocarbons were made in order to compare the infrared spectra of the products of the side chain ethylation with known compounds. These syntheses were made by known methods. The experimental conditions used in these runs and the results obtained are summarized in the following three tables. Table V gives the side chain ethylation results with toluene, ethylbenzene, isopropylbenzene, tert-butylbenzene, and cyclohexylbenzene:

benzenes containing two or three hydrogen atoms on the carbon atom attached to the benzene ring. For instance, in the case of ethylation of isopropylbenzene and cyclohexylbenzene only 37% and 18% of the aromatic hydrocarbons reacted, respectively. In the case of the reacted isopropylbenzene, 78% was converted to tert-amylbenzene. In the case of cyclohexylbenzene, it is assumed that the product from the monoethylation was 1-ethyl-1-phenylcyclohexane.

Alkylbenzenes which do not contain hydrogen on the carbon atom attached to the aromatic nucleus do not readily, if at all, undergo side chain alkylation. For example, tert-butylbenzene did not seem to react with ethylene under the conditions at which the other alkylbenzenes reacted.

In order to determine whether the position of the alkyl groups of dialkylbenzenes has any effect upon side chain ethylation, ortho-, meta-, and paraxylene were reacted with ethylene under pressure in the presence of about 5%

*Table V*

SIDE CHAIN ETHYLATION OF ALKYLBENZENE WITH SODIUM AND ANTHRACENE

| Run No. | 9 | 10 | 11 | 12 | 13 |
|---|---|---|---|---|---|
| Aromatic Compound | Toluene | Ethylbenzene | Isopropylbenzene | Tert-butylbenzene | Cyclohexylbenzene |
| Grams | 92 | 106 | 120 | 134 | 160 |
| Mols | 1 | 1 | 1 | 1 | 1 |
| Ethylene, Atmospheres | 30 | 30 | 30 | 30 | 30 |
| Sodium: | | | | | |
| Grams | 10 | 10 | 10 | 5.0 | 6.2 |
| Mols | 0.44 | 0.44 | 0.44 | 0.22 | 0.27 |
| Anthracene: | | | | | |
| Grams | 4 | 4 | 4 | 2 | 2 |
| Mols | 0.02 | 0.02 | 0.02 | 0.01 | 0.01 |
| Temperature, °C | 200 | 200–206 | 200–225 | 200–229 | 200–227 |
| Duration, Hours | 5 | 2.8 | 4.5 | 3.5 | 5 |
| Aromatic Reacted, Mol. Percent | 65 | 68 | 37 | 0 | 18 |
| Yield, Mol Percent: | | | | | |
| n-Propylbenzene | 57 | | | | |
| 3-Phenylpentane | 21.6 | | | | |
| sec-butylbenzene | | 75 | | | |
| tert-heptylbenzene | | 10 | | | |
| tert-amylbenzene | | | 78 | | |
| 1-ethyl-1-phenylcyclohexane | | | | | 50 |
| Mol Ratio, Sodium/Promoter | 22 | 22 | 22 | 22 | 27 |
| Wt. Percent Promoter, Based on Sodium | 40 | 40 | 40 | 40 | 32.2 |

It was found that ethylbenzene reacts with ethylene as readily as toluene, namely 65–68% of the aromatic charged underwent side chain ethylation. In the case of ethylbenzene, 75% of the aromatic which reacted underwent monoethylation, while 10% underwent diethylation. In the case of toluene, however, 57% underwent monoethylation and 22% diethylation. The monoethylated ethylbenzene was composed entirely of sec-butylbenzene while diethylated ethylbenzene consisted most probably of tert-hexylbenzene. In the case of monoethylated and diethylated toluene, the product consisted of n-propylbenzene and 3-phenylpentane respectively. The above results indicate that the ethylation of an alkyl group containing two hydrogen atoms on the carbon atom attached to the aromatic ring is faster than that containing three hydrogen atoms as in the case of toluene. The side chain ethylation of alkylbenzenes containing one hydrogen atom on the carbon atom attached to the aromatic nucleus is much slower than is similar side chain ethylation of alkylby weight of sodium and 2% by weight of anthracene. Experimental data are given in Table VI:

*Table VI*

SIDE CHAIN ETHYLATION OF XYLENES WITH SODIUM AND ANTHRACENE

| Run No. | 14 | 15 | 16 |
|---|---|---|---|
| Aromatic Compound, Xylene | Ortho- | Meta- | Para- |
| Grams | 106 | 106 | 106 |
| Mols | 1 | 1 | 1 |
| Ethylene, Atmospheres | 30 | 30 | 30 |
| Sodium: | | | |
| Grams | 5.9 | 5.2 | 5.0 |
| Mols | 0.25 | 0.23 | 0.22 |
| Anthracene: | | | |
| Grams | 2 | 2 | 2 |
| Mols | 0.01 | 0.01 | 0.01 |
| Temperature, °C | 200 | 200 | 200 |
| Duration, Hours | 3 | 4 | 3 |
| Aromatic Reacted, Mol Percent | 61 | 52 | 31 |
| Yield, Mol Percent: | | | |
| n-Propyltoluene | 66 | 66 | 80 |
| Diethylated xylene | a 28 | b 29 | c 12 |
| Mol Ratio, Sodium/Promoter | 25 | 23 | 22 |
| Wt. Percent Promoter, Based on Sodium | 33.8 | 38.4 | 40 | a Contained 50% o-tolyl-3-pentane.
b Contained 75% m-tolyl-3-pentane.
c Contained 65% p-tolyl-3-pentane.

The yields of ethylated xylenes are expressed in mol per cent based on xylenes reacted. It was found that the rate of the reaction increases from para- to meta- to ortho- in ratios of 31 to 52 to 61. The monoethylated compounds consisted of the corresponding n-propyltoluene amounting to from 66% to 80% based on the xylenes reacted. The diethylated xylenes amounting to from 12% to 29% consisted primarily of the corresponding 3-tolylpentane. The structures of the compounds were determined by synthesizing the isomeric n-propyl-toluenes and 3-tolylpentanes and the infrared spectra of the ethylated xylenes were compared directly with those of the synthetic samples. In the case of diethylated xylenes, about 25 to 50% of the product consisted of unknown hydrocarbons, most probably of the di-normal propylbenzenes. From the above results it seems that the ethylation of the propyl group in n-propyltoluene proceeds faster than that of the methyl group.

The side chain ethylation of three other miscellaneous alkylaromatic hydrocarbons has been demonstrated. The results obtained with mesitylene, indan, and methylnaphthalene are presented in the following Table VII:

ditions forming 1-ethylindan, which shows that the saturated ring on the indan adds an alkyl group.

In the ethylation of methylnaphthalene, a mixture of alpha and beta-methylnaphthalene was used. According to ultraviolet and infrared spectra, the ethylation product consisted of propylnaphthalenes.

EXAMPLE IV

To evaluate the effect of polycyclic hydrocarbon catalyst promoters, several runs were made in which one mol of toluene and 30 atmospheres of ethylene were reacted in the presence of sodium and in each case a different polycyclic hydrocarbon. From the results obtained in such runs, Table VIII has been prepared in which a comparison of the yields of n-propylbenzene so produced from toluene is given. It is to be noted that the different polycyclic hydrocarbons are not identical in their promoting effect upon the side chain ethylation reaction but that anthracene appears to be the preferred polycyclic hydrocarbon catalyst promoter. The data are summarized in the following table:

*Table VIII*

EFFECT OF POLYCYCLIC HYDROCARBON CATALYST PROMOTER ON THE SIDE CHAIN ETHYLATION OF TOLUENE WITH SODIUM

| Run No. | 20 | 21 | 22 | 23 | 24 | 25 | 26 |
|---|---|---|---|---|---|---|---|
| Toluene: | | | | | | | |
| Grams | 92 | 92 | 92 | 92 | 92 | 92 | 92. |
| Mols | 1 | 1 | 1 | 1 | 1 | 1 | 1. |
| Ethylene, Atmospheres | 30 | 30 | 30 | 30 | 30 | 30 | 30. |
| Sodium: | | | | | | | |
| Grams | 10 | 7.0 | 5.0 | 5.3 | 6.0 | 7.7 | 7.0. |
| Mols | 0.44 | 0.30 | 0.22 | 0.23 | 0.26 | 0.33 | 0.30. |
| Promoter | Anthracene | Dihydro-anthracene | Fluorene | Phenanthrene | Tetralin | Diphenyl-methane | o-diphenyl-benzene. |
| Grams | 4.0 | 2.0 | 2.0 | 2.0 | 2.0 | 3.4 | 2.3. |
| Mols | 0.02 | 0.01 | 0.01 | 0.01 | 0.02 | 0.02 | 0.02. |
| Temperature, °C | 200 | 200–227 | 200–227 | 200–250 | 195–275 | 200–230 | 225. |
| Duration, Hours | 5 | 4.25 | 4 | 4 | 4.5 | 5 | 4. |
| Toluene Reacted, Mol Percent | 65 | 18 | 26 | 15 | <7 | <7 | <9. |
| Yield, Mol Percent: | | | | | | | |
| n-Propylbenzene | 57 | 56 | 67 | 47 | <14 | 14 | 22. |
| 3-Phenylpentane | 21.6 | <6 | 8 | | | | |
| Mol Ratio, Sodium/Promoter | 22 | 30 | 22 | 23 | 13 | 16.5 | 15. |
| Wt. Percent Promoter, Based on Sodium | 40 | 28.6 | 40 | 37.7 | 33.3 | 44.2 | 32.8. |

*Table VII*

ETHYLATION OF MISCELLANEOUS ALKYLAROMATIC HYDROCARBONS WITH SODIUM AND ANTHRACENE

| Run No. | 17 | 18 | 19 |
|---|---|---|---|
| Aromatic Compound | Mesitylene | Indan | Methylnaphthalene. |
| Grams | 120 | 118 | 142. |
| Mols | 1 | 1 | 1. |
| Ethylene, Atmospheres | 30 | 30 | 30. |
| Sodium: | | | |
| Grams | 6 | 6.5 | 5.2. |
| Mols | 0.26 | 0.28 | 0.23. |
| Anthracene: | | | |
| Grams | 2.5 | 2.0 | 2.0. |
| Mols | 0.01 | 0.01 | 0.01. |
| Temperature, °C | 200 | 225 | 200. |
| Duration, Hours | 4.5 | 7 | 4.5. |
| Aromatic Reacted, Mol Percent | 19 | 14 | 39. |
| Yield, Mol Percent: | | | |
| 1,3-dimethyl-5-n-propylbenzene | 79 | | |
| 1-ethylindan | | 26 | |
| n-propylnaphthalene | | | 64. |
| 3-methylpentane | | | 10. |
| Mol Ratio, Sodium/Promoter | 26 | 28 | 23. |
| Wt. Percent Promoter, Based on Sodium | 41.7 | 30.8 | 38.5. |

By comparing the rate of ethylation of toluene, m-xylene, and mesitylene, it was noted that the extent of ethylation drops off from 65% to 52% to 19% respectively. The yield of monoethylated mesitylene was 79%, based on the hydrocarbon reacted, and consisted of 1,3-dimethyl-5-n-propyl-benzene. The increase in the number of methyl groups on the benzene ring appears to have an inhibiting effect upon side chain ethylation.

Only 14% of the indan reacted under the above con-

We claim as our invention:

1. In a process which comprises reacting a non-conjugated olefinic hydrocarbon and an aromatic compound selected from the group consisting of carbocyclic aromatic and heterocyclic aromatic ring compounds having attached to a nuclear carbon atom a carbon atom of a hydrocarbon group selected from the group consisting of an alkyl group, a cycloalkyl group, a cycloalkalkyl group and an aralkyl group, and to which last-named carbon atom is attached at least one hydrogen atom, the improvement which comprises carrying out the reaction at a temperature of from about 100° to about 350° C. and at a pressure of from about 5 to about 50 atmospheres in the presence of a free alkali metal and of a minor promoting amount of a polycyclic hydrocarbon capable of reacting with a portion of said free alkali metal to form a metalized polycyclic hydrocarbon, and recovering the resultant condensation product.

2. In a process which comprises reacting a non-conjugated olefinic hydrocarbon and an aromatic compound selected from the group consisting of carbocyclic aromatic and heterocyclic aromatic ring compounds having attached to a nuclear carbon atom a carbon atom of a saturated hydrocarbon group and to which last-named carbon atom is attached at least one hydrogen atom, the improvement which comprises carrying out the reaction at a temperature of from about 100° to about 350° C. and at a pressure of from about 5 to about 50 atmospheres in the presence of a free alkali metal and of a minor promoting amount of a polycyclic hydrocarbon capable of reacting with a portion of said free alkali metal to form a metalized polycyclic hydrocarbon, and recovering the resultant condensation product.

3. In a process which comprises reacting a nonconjugated olefinic hydrocarbon and an aromatic compound selected from the group consisting of carbocyclic aromatic and heterocyclic aromatic ring compounds having attached to a nuclear carbon atom a carbon atom of a saturated hydrocarbon group and to which last-named carbon atom is attached at least one hydrogen atom, the improvement which comprises carrying out the reaction at a temperature of from about 100° to about 350° C. and at a pressure of from about 5 to about 50 atmospheres in the presence of a free alkali metal and of a minor promoting amount of a polynuclear aromatic hydrocarbon capable of reacting with a portion of said free alkali metal to form a metalized polynuclear aromatic hydrocarbon, and recovering the resultant condensation product.

4. In a process which comprises reacting a non-conjugated olefinic hydrocarbon and an aromatic compound selected from the group consisting of carbocyclic aromatic and heterocyclic aromatic ring compounds having attached to a nuclear carbon atom a carbon atom of a saturated hydrocarbon group and to which last-named carbon atom is attached at least one hydrogen atom, the improvement which comprises carrying out the reaction at a temperature of from about 100° to about 350° C. and at a pressure of from about 5 to about 50 atmospheres in the presence of a free alkali metal and of a minor promoting amount of a fused ring polycyclic aromatic hydrocarbon capable of reacting with a portion of said free alkali metal to form a metalized fused ring polycyclic aromatic hydrocarbon, and recovering the resultant condensation products.

5. In a process which comprises reacting a monoolefin and an aromatic compound selected from the group consisting of carbocyclic aromatic and heterocyclic aromatic ring compounds having attached to a nuclear carbon atom a carbon atom of a hydrocarbon group selected from the group consisting of an alkyl group, a cycloalkyl group, a cycloakalkyl group and an aralkyl group, and to which last-named carbon atom is attached at least one hydrogen atom, the improvement which comprises carrying out the reaction at a temperature of from about 100° to about 350° C. and at a pressure of from about 5 to about 50 atmospheres in the presence of a free alkali metal and of a minor promoting amount of a polycyclic hydrocarbon capable of reacting with a portion of said free alkali metal to form a metalized polycyclic hydrocarbon, and recovering the resultant condensation product.

6. In a process which comprises reacting a monoolefin and an aromatic compound selected from the group consisting of carbocyclic aromatic and heterocyclic aromatic ring compounds having attached to a nuclear carbon atom a carbon atom of a saturated hydrocarbon group and to which last-named carbon atom is attached at least one hydrogen atom, the improvement which comprises carrying out the reaction at a temperature of from about 100° to about 350° C. and at a pressure of from about 5 to about 50 atmospheres in the presence of a free alkali metal and of a minor promoting amount of a polycyclic hydrocarbon capable of reacting with a portion of said free alkali metal to form a metalized polycyclic hydrocarbon, and recovering the resultant condensation product.

7. In a process which comprises reacting a monoolefin and an aromatic compound selected from the group consisting of carbocyclic aromatic and heterocyclic aromatic ring compounds having attached to a nuclear carbon atom a carbon atom of a saturated hydrocarbon group and to which last-named carbon atom is attached at least one hydrogen atom, the improvement which comprises carrying out the reaction at a temperature of from about 100° to about 350° C. and at a pressure of from about 5 to about 50 atmospheres in the presence of a free alkali metal and of a minor promoting amount of a polynuclear aromatic hydrocarbon capable of reacting with a portion of said free alkali metal to form a metalized polynuclear aromatic hydrocarbon, and recovering the resultant condensation product.

8. In a process which comprises reacting a monoolefin and an aromatic compound selected from the group consisting of carbocyclic aromatic and heterocyclic aromatic ring compounds having attached to a nuclear carbon atom a carbon atom of a saturated hydrocarbon group and to which last-named carbon atom is attached at least one hydrogen atom, the improvement which comprises carrying out the reaction at a temperature of from about 100° to about 350° C. and at a pressure of from about 5 to about 50 atmospheres in the presence of a free alkali metal and of a minor promoting amount of a fused ring polycyclic aromatic hydrocarbon capable of reacting with a portion of said free alkali metal to form a metalized fused ring polycyclic aromatic hydrocarbon, and recovering the resultant condensation products.

9. A process which comprises reacting an alkene and an aromatic hydrocarbon having attached to a nuclear carbon atom a carbon atom of a hydrocarbon group selected from the group consisting of an alkyl group, a cycloalkyl group, a cycloalkalkyl group and an aralkyl group, and to which last-named carbon atom is attached at least one hydrogen atom, the process being carried out at a temperature of from about 100° to about 350° C. and at a pressure of from about 5 to about 50 atmospheres in the presence of a free alkali metal and of a minor promoting amount of a polycyclic hydrocarbon capable of reacting with a portion of said free alkali metal to form a metalized polycyclic hydrocarbon, and recovering the resultant condensation product.

10. A process which comprises reacting an alkene and an aromatic hydrocarbon having attached to a nuclear carbon atom a carbon atom of a saturated hydrocarbon group and to which last-named carbon atom is attached at least one hydrogen atom at a temperature of from about 100° to about 350° C. and at a pressure of from about 5 to about 50 atmospheres in the presence of a free alkali metal and of a minor promoting amount of a polycyclic hydrocarbon capable of reacting with a portion of said free alkali metal to form a metalized polycyclic hydrocarbon, and recovering the resultant condensation product.

11. A process which comprises reacting an alkene and an aromatic hydrocarbon having attached to a nuclear carbon atom a carbon atom of a saturated hydrocarbon group and to which last-named carbon atom is attached at least one hydrogen atom at a temperature of from about 100° to about 350° C. and at a pressure of from about 5 to about 50 atmospheres in the presence of a free alkali metal and of a minor promoting amount of a polynuclear aromatic hydrocarbon capable of reacting with a portion of said free alkali metal to form a metalized polynuclear aromatic hydrocarbon, and recovering the resultant condensation product.

12. A process which comprises reacting an alkene and an aromatic hydrocarbon having attached to a nuclear carbon atom a carbon atom of a saturated hydrocarbon group and to which last-named carbon atom is attached at least one hydrogen atom at a temperature of from about 100° to about 350° C. and at a pressure of from about 5 to about 50 atmospheres in the presence of a free alkali metal and of a minor promoting amount of a fused ring polycyclic aromatic hydrocarbon capable of reacting a portion of said free alkali metal to form a metalized fused ring polycyclic aromatic hydrocarbon, and recovering the resultant condensation products.

13. In a process which comprises reacting ethylene and an aromatic compound selected from the group consisting of carbocyclic aromatic and heterocyclic aromatic ring compounds having attached to a nuclear carbon atom a carbon atom of a hydrocarbon group selected from the group consisting of an alkyl group, a cycloalkyl group, a cycloalkalkyl group and an aralkyl group, and to which last-named carbon atom is attached at least one hydrogen atom, the improvement which comprises carrying out the reaction at a temperature of from about 100° to about 350° C. and at a pressure of from about 5 to about 50 atmospheres in the presence of a free alkali metal and of a minor promoting amount of a polycyclic hydrocarbon capable of reacting with a portion of said free alkali metal to form a metalized polycyclic hydrocarbon, and recovering the resultant condensation product.

14. In a process which comprises reacting ethylene and an aromatic compound selected from the group consisting of carbocyclic aromatic and heterocyclic aromatic ring compounds having attached to a nuclear carbon atom a carbon atom of a saturated hydrocarbon group and to which last-named carbon atom is attached at least one hydrogen atom, the improvement which comprises carrying out the reaction at a temperature of from about 100° to about 350° C. and at a pressure of from about 5 to about 50 atmospheres in the presence of a free alkali metal and of a minor promoting amount of a polycyclic hydrocarbon capable of reacting with a portion of said free alkali metal to form a metalized polycyclic hydrocarbon, and recovering the resultant condensation product.

15. In a process which comprises reacting ethylene and an aromatic compound selected from the group consisting of carbocyclic aromatic and heterocyclic aromatic ring compounds having attached to a nuclear carbon atom a carbon atom of a saturated hydrocarbon group and to which last-named carbon atom is attached at least one hydrogen atom, the improvement which comprises carrying out the reaction at a temperature of from about 100° to about 350° C. and at a pressure of from about 5 to about 50 atmospheres in the presence of a free alkali metal and of a minor promoting amount of a polynuclear aromatic hydrocarbon capable of reacting with a portion of said free alkali metal to form a metalized polynuclear aromatic hydrocarbon, and recovering the resultant condensation product.

16. In a process which comprises reacting ethylene and an aromatic compound selected from the group consisting of carbocyclic aromatic and heterocyclic aromatic ring compounds having attached to a nuclear carbon atom a carbon atom of a saturated hydrocarbon group and to which last-named carbon atom is attached at least one hydrogen atom, the improvement which comprises carrying out the reaction at a temperature of from about 100° to about 350° C. and at a pressure of from about 5 to about 50 atmospheres in the presence of a free alkali metal and of a minor promoting amount of a fused ring polycyclic aromatic hydrocarbon capable of reacting with a portion of said free alkali metal to form a metalized fused ring polycyclic aromatic hydrocarbon, and recovering the resultant condensation products.

17. A process for producing a longer chain aromatic hydrocarbon which comprises reacting ethylene with an aromatic hydrocarbon having attached to a nuclear carbon atom a carbon atom of a saturated hydrocarbon group and to which last-named carbon atom is attached at least one hydrogen atom at a condensation temperature of from about 100° to about 350° C. and at a condensation pressure of from about 5 to about 50 atmospheres in the presence of a catalyst comprising essentially a free alkali metal and a minor promoting amount of a polycyclic hydrocarbon capable of reacting with a portion of said free alkali metal to form a metalized polycyclic hydrocarbon and recovering the resultant condensation products.

18. A process for producing a longer chain benzene hydrocarbon which comprises reacting ethylene with a benzene hydrocarbon having attached to a nuclear carbon atom a carbon atom of a saturated hydrocarbon group and to which last-named carbon atom is attached at least one hydrogen atom at a condensation temperature of from about 100° to about 350° C. and at a condensation pressure of from about 5 to about 50 atmospheres in the presence of a catalyst comprising essentially a free alkali metal and a minor promoting amount of a polycyclic hydrocarbon capable of reacting with a portion of said free alkali metal to form a metalized polycyclic hydrocarbon, and recovering the resultant condensation products.

19. A process for producing n-propylbenzene which comprises condensing ethylene with toluene at a condensation temperature of from about 100° to about 350° C. and at a condensation pressure of from about 5 to about 50 atmospheres in the presence of a catalyst comprising essentially a free alkali metal and a minor promoting amount of a polycyclic hydrocarbon capable of reacting with a portion of said free alkali metal to form a metalized polycyclic hydrocarbon, and recovering the resultant n-propylbenzene.

20. A process for producing n-propylbenzene which comprises condensing ethylene and toluene at a condensation temperature of from about 100° to about 350° C. and at a condensation pressure of from about 5 to about 50 atmospheres in the presence of a catalyst comprising essentially free sodium and a minor promoting amount of anthracene capable of reacting with a portion of said free sodium to form a sodium anthracene, and recovering the resultant n-propylbenzene.

References Cited in the file of this patent

UNITED STATES PATENTS

| | | |
|---|---|---|
| 2,448,641 | Whitman | Sept. 7, 1948 |
| 2,548,803 | Little, Jr. | Apr. 10, 1951 |
| 2,670,390 | Pines et al. | Feb. 23, 1954 |
| 2,688,044 | Pines et al. | Aug. 31, 1954 |